June 6, 1944.     E. F. FELDHEIM     2,350,599
HEADLIGHT SIGNAL
Filed Nov. 4, 1941
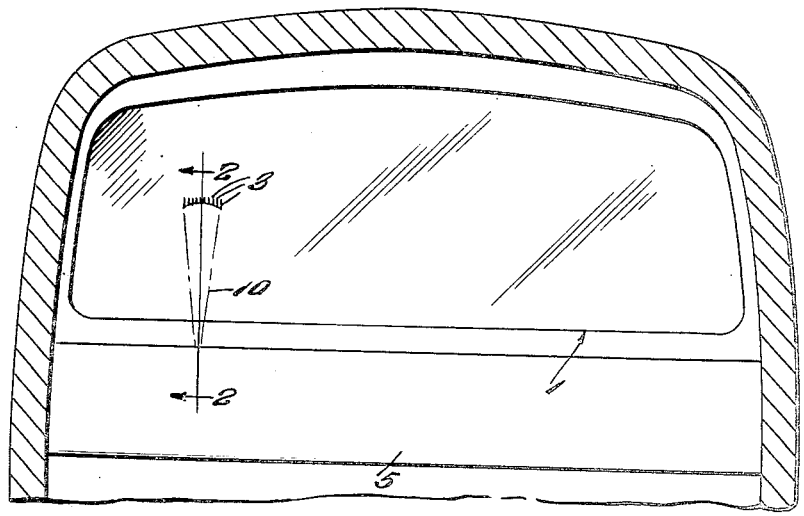
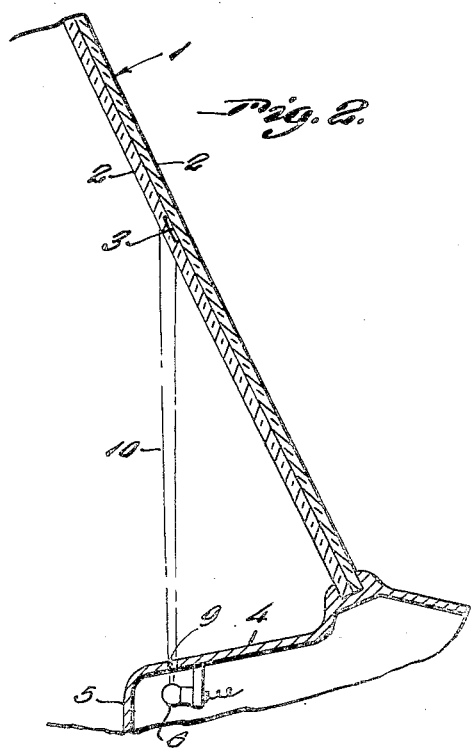
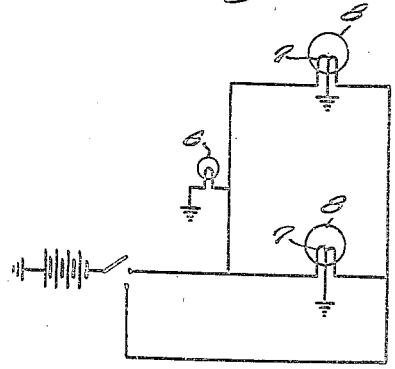
Inventor
Einar F. Feldheim
By Clarence A. O'Brien
Attorney Patented June 6, 1944

2,350,599

UNITED STATES PATENT OFFICE 2,350,599

HEADLIGHT SIGNAL

Einar F. Feldheim, Minneapolis, Minn.

Application November 4, 1941, Serial No. 417,863

3 Claims. (Cl. 177—311)

The present invention relates to new and useful improvements in headlight signals, particularly for automobiles, and has for its primary object to provide, in a manner as hereinafter set forth, novel means for indicating when the high beams of the headlights are on without the necessity of the operator removing his eyes from the highway ahead to ascertain this fact.

Other objects of the invention are to provide a headlight signalling or indicating means of the aforementioned character which will be comparatively simple in construction, highly efficient and reliable in use, compact and which may be manufactured and installed at low cost.

All of the foregoing and still further objects and advantages of the invention will become apparent from a study of the following specification, taken in connection with the accompanying drawing wherein like characters of reference designate corresponding parts through the several views, and wherein:

Figure 1 is a cross-sectional view through a portion of a motor vehicle body comprising a windshield embodying a portion of the present invention.

Figure 2 is a vertical sectional view, taken substantially on the line 2—2 of Figure 1.

Figure 3 is a diagrammatic view of the electric wiring system.

Referring now to the drawing in detail, it will be seen that the embodiment of the invention which has been illustrated comprises a motor vehicle windshield 1 of safety glass, said windshield including laminations 2. The inner face of one of the laminations 2 has formed therein a plurality of substantially V-shaped grooves or channels providing reflective surfaces 3.

Mounted beneath the upper portion 4 of the instrument board 5 of the vehicle is an electric lamp 6. As illustrated to advantage in Figure 3 of the drawing, the lamp 6 is in the electric circuits to the high beam filaments 7 of the headlight lamps 8 of the vehicle. An opening 9 is provided in the portion 4 of the instrument board 5 for the passage of a beam of light, as at 10, from the lamp 6 to the reflective area of the windshield 1 which is provided by the grooves 3.

It is thought that the manner in which the invention functions will be readily apparent from a consideration of the foregoing. Briefly, when the high beams of the vehicle headlights are on, the lamp 6 is also energized. Thus, through the opening 9 the reflective area of the windshield 1 is illuminated, which area may be observed by the operator of the vehicle while his eyes are focused on the highway ahead. The reflective area of the windshield is preferably located just out of the normal line of vision of the driver. In the embodiment shown, an arcuate groove extends transversely of the windshield and a plurality of comparatively short grooves extend upwardly therefrom. If desired, the surfaces of these grooves or the lamp 6 may be colored red, for example.

It is believed that the many advantages of a headlight signal or indicator in accordance with the present invention will be readily understood, and although a preferred embodiment is as illustrated and described, it is to be understood that changes in the details of construction and in the combination and arrangement of parts may be resorted to which will fall within the scope of the invention as claimed.

What is claimed is:

1. The combination with a vehicle windshield having a light-diffusing portion, of an electric lamp positioned to project a beam of light on said light diffusing portion of the windshield for illuminating the same.

2. The combination with an instrument board having an opening, and a windshield adjacent said instrument board having a light-diffusing portion, of an electric lamp mounted beneath the instrument board and arranged to project a beam of light through said opening on the light diffusing portion of the windshield.

3. The combination with a vehicle windshield having a light-diffusing portion, of an electric lamp positioned to project a beam of light on said light diffusing portion of the windshield for illuminating the same, said windshield including laminations, one of said laminations having grooves in its inner face providing said light-diffusing portion.

EINAR F. FELDHEIM.